Patented Dec. 23, 1924.

1,520,437

UNITED STATES PATENT OFFICE.

MARVIN PIPKIN, OF FORT MEADE, FLORIDA.

PROCESS OF CATALYZING GASEOUS REACTIONS.

No Drawing.   Application filed September 29, 1921.   Serial No. 504,228.

*To all whom it may concern:*

Be it known that I, MARVIN PIPKIN, a citizen of the United States, residing at Fort Meade, in the county of Polk, State of Florida, have invented certain new and useful Improvements in Processes of Catalyzing Gaseous Reactions, of which the following is a specification.

I have discovered that activated charcoal is an excellent catalytic material for accelerating reactions between gases. Further, I have found that the catalytic properties of the activated charcoal can be greatly accelerated by impregnating the same with a metal, metallic oxide or mixtures of the same by my improved process.

Activated charcoal is charcoal which has been treated at elevated temperatures with an oxidizing gas which has the capacity of reacting with the charcoal to remove a fractional portion of the same from within its structure, thus leaving the resultant char highly porous and possessing a large amount of carbon surface. The large surfaces of the activated charcoal then become contacting surfaces for the gases. It is probably due to the extremely large surfaces available for contact that the activated carbon possesses its high catalytic value.

By bringing a mixture of gases at the appropriate temperature in contact with activated charcoal, I am able to cause reaction of the gases to form new products. The temperature best adapted for reaction is specific for each gaseous mixture. In general it may be stated that as low a temperature as possible is used, provided a satisfactory yield of product is obtained. High pressures frequently are used to increase the concentration of reacting gases, the precise pressure being regulated in accordance with each specific reaction.

The following example illustrates an application of my invention:

Example I: A gaseous mixture of oxygen and nitric oxide in the proportion of one volume of oxygen to two of oxide of nitrogen is passed thru activated charcoal which is being cooled, thus maintaining a temperature below the kindling point of the activated charcoal, the temperature of 150° C. being satisfactory. The mixed gases in passing thru the activated charcoal unite to form nitrogen dioxide $NO_2$. The nitrogen dioxide is then passed into water, producing a mixture of nitric and nitrous acids. Upon heating the nitrous acid, nitric acid is produced and nitric oxide generated. This nitric oxide is passed back thru the system again for conversion into nitric acid. The nitric acid is concentrated to any desirable concentration or converted into salts by neutralization with alkalies, and the salt solution evaporated to a solid state in accordance with the requirements.

For certain purposes I have found that metals or metallic oxides can be incorporated internally in the carbon, such process being termed "impregnation," and to accomplish this purpose the following method has been found especially desirable. The method is economical to perform and simple in operation. A decomposable salt of the metal and oxide of the metal to be impregnated is dissolved in water, and the solution added to the activated carbon. In certain cases the decomposable salt can be added to the activated carbon as such in the form of a mixture with the latter or can be incorporated with the activated carbon by fusion of the salt with the activated carbon. The concentration of the solution used and the quantity of the solution added are regulated in accordance with the percentage of metal or oxide desired in the activated carbon. The water is then removed by evaporation, and after such drying the material is heated to or above the decomposition point of the compound used. In many cases the drying and the decomposing can be accomplished simultaneously. If the oxide is reducible by carbon at the temperature of decomposition mentioned above, then the activated carbon will be impregnated with metal. If, however, the oxide is not reducible by carbon then the resultant product is activating carbon impregnated with the oxide. In general, heating with carbon in the absence of air tends to give the metal, and heating in the presence of air tends to produce the oxide. Conditions are regulated accordingly, depending upon the product desired.

The following example illustrates the applicability of the above:

Example II: Activated carbon is treated with a solution of copper nitrate. The amount of solution used is just sufficient to fill the pores of the carbon and moisten the surfaces. The material containing the carbon and copper nitrate solution adsorbed therein is then heated to evaporate the water, leaving the copper nitrate within the pores of the activated charcoal. Heating is continued then to a temperature of approximately 500° C. to decompose the copper nitrate, all being accomplished in a single operation. Thirty minutes suffice for the treatment to give a satisfactory product. The material is cooled out of contact with air, and the resultant material is activated charcoal impregnated with metallic copper. If it is desired to obtain impregnated copper oxide, it is necessary to roast and calcine in the presence of air or some other oxidizing substance, in which case cooling in contact with air is allowable, provided the temperature of the material upon discharge into the air is not sufficiently great to cause the carbon to burn. By proper regulation of the degree of heating and air supply a mixture of metallic copper and copper oxide impregnated into the activated carbon is obtained.

Among other metals and oxides which are adapted to this modification of my invention are lead, zinc, silver, cadmium, iron, nickel, mercury and bismuth. Among other oxides of metals which cannot be reduced by carbon, but which can be impregnated into activated carbon by this method, are manganese, chromium and aluminum. By my treatment such compounds as sodium zincate and potassium dichromate can be impregnated into activated carbon so that the final product in each case contains two different metallic oxides or a metal with an oxide of another metal. The above metals are typical of a large number which may be used in like manner. Such impregnated materials when they contain an oxidizing agent such as potassium dichromate, are valuable for the oxidizing power of the oxidizing agent acting on the adsorbed gases. Likewise the adsorbed metallic oxides in certain cases function as oxidizing agents on the adsorbed gas. Impregnated metal products function ordinarily as reducing agents, or as catalytic producing surfaces for increasing the catalytic power of the activated charcoal.

As a special use for impregnating carbon I would mention carbon impregnated with copper and its use in removing arsine and phosphine by oxidation when such are present in a mixture of gases containing sufficient oxygen to combine with the phosphine and arsine when passed thru copper impregnated activated charcoal. Also this material has great value for removing such gases as phosgene $COCl_2$, as well as other gases used in chemical warfare, and as such find specific application. My invention is broad in its scope both as to materials impregnated in the activated charcoal and as to the general methods of preparing and using the same, and in this relation the examples given above are only illustrative of the scope of my invention, said scope being limited only in this respect to the following claims.

I claim as my invention:

1. The process of catalyzing gaseous reactions by contacting gaseous mixtures with activated carbon at pressures greater than atmospheric pressure.

2. The process of producing gaseous reactions by contacting gaseous mixtures with activated carbon impregnated with a metal.

3. The process of producing gaseous reactions by contacting gaseous mixtures with activated carbon impregnated with a metallic oxide.

4. The process of producing gaseous reactions by contacting gaseous mixtures with activated carbon impregnated with an oxide.

5. The process of producing gaseous reactions by contacting gaseous mixtures with activated carbon impregnated with a mixture of metal and oxide.

In testimony whereof, I affix my signature.

MARVIN PIPKIN.